United States Patent [19]

Hendrickson

[11] 4,274,643
[45] Jun. 23, 1981

[54] VEHICLE LEVELING DEVICE

[75] Inventor: Richard T. Hendrickson, South Bend, Ind.

[73] Assignee: The Bendix Corporation, Southfield, Mich.

[21] Appl. No.: 947,330

[22] Filed: Oct. 2, 1978

[51] Int. Cl.³ .............................................. B60G 3/14
[52] U.S. Cl. .................................... 280/6.1; 280/706; 280/714; 180/41
[58] Field of Search .............. 280/6 R, 6 H, 6.1, 6.11, 280/706, 711, 713, 714; 172/395, 400; 180/41; 267/65 D

[56] References Cited

U.S. PATENT DOCUMENTS

| | | | |
|---|---|---|---|
| 2,998,244 | 8/1961 | Francis | 267/65 D |
| 3,037,763 | 6/1962 | Steinhagen | 280/706 |
| 3,502,347 | 3/1970 | Busignies | 280/6 R |
| 4,145,073 | 3/1979 | McLuckie | 280/714 |

Primary Examiner—Robert R. Song
Attorney, Agent, or Firm—Paul David Schoenle; Ken C. Decker

[57] ABSTRACT

A leveling device is attached to a vehicle to assist in maintaining a body assembly at its preferred height even when added weight is installed in the body assembly of the vehicle. The leveling device includes a housing which is connected to either the body assembly or a wheel mounting assembly and a piston which is movably supported in the housing extends therefrom to connect with the other of the body assembly and the wheel mounting assembly. The piston cooperates with the housing to substantially define a pair of chambers and a passageway within the piston connects the chambers with each other. A pressure source, such as a vacuum or low pressure air pump, is in communication with the passageway and a first valve normally closes communication between the pair of chambers and the pressure source. A control member carries a second valve and cooperates with the first valve, when the body assembly is moved toward the wheel mounting assembly beyond a normal travel distance, in order to open one of the chambers to the pressure source. As a result a pressure differential is established across the piston so as to oppose movement of the body assembly toward the wheel mounting assembly. The control member is actuated automatically when the body assembly is moved toward the wheel mounting assembly to a position distance between the two assemblies.

9 Claims, 3 Drawing Figures

VEHICLE LEVELING DEVICE

BACKGROUND OF THE INVENTION

Heretofore, leveling devices in vehicles have been integrated into shock absorber assemblies to provide a lift force for a body assembly. These leveling devices were outfitted with fill valves so that a vehicle operator could pressurize the leveling device to increase the lifting force exerted by a conventional spring assembly between the body assembly and a wheel mounting assembly. Examples of such leveling devices are the air shock and the air bag.

Another type of leveling device is the self-pumping shock absorber which uses the up and down motion between the body and wheel mounting assemblies to generate fluid pressure which provides a lifting force when the body assembly is lowered a predetermined distance toward the wheel mounting assembly.

The weight reduction of vehicles has rendered the state of the art of leveling devices ineffective as less lifting force is required to maintain the body assembly in a preferred vertical position. Consequently, it is believed to be an advance in the state of the art to provide a leveling device which is adapted for use on a light weight vehicle.

SUMMARY OF THE INVENTION

A leveling device is disposed, as a separate unit or integrated with a shock absorber, between a body assembly and a wheel mounting assembly. The leveling device includes a housing connected to one of the assemblies and a piston connected to the other assembly. The piston is movably disposed within the housing to substantially define a pair of chambers and passages within the piston communicate the pair of chambers with each other. A pressure source such as a vacuum manifold is in communication with the passages and a first valve member normally closes communication between the pair of chambers and the pressure source. A control member acts as a height sensor and cooperates with the first valve member to open communication between the pressure source and one of the chambers. A second valve member carried by the control member cooperates with the piston to close communication between the chambers when the first valve member is in an open position. The other chamber is open to atmosphere so that a pressure differential is created across the piston. The pressure differential creates a lifting force separating the body assembly from the wheel mounting assembly.

It is an object of the present invention to provide a simple leveling device which is coupled to a vehicle pressure source and automatically operable to assist in maintaining a body assembly in a preferred vertical position relative to a wheel mounting.

It is a further object of the present invention to provide a control member in a leveling device which is responsive to the height of the body assembly to communicate one of a pair of chambers in the leveling device with a pressure source and to close the other chamber to the pressure source.

DETAILED DESCRIPTION

Figure 1:
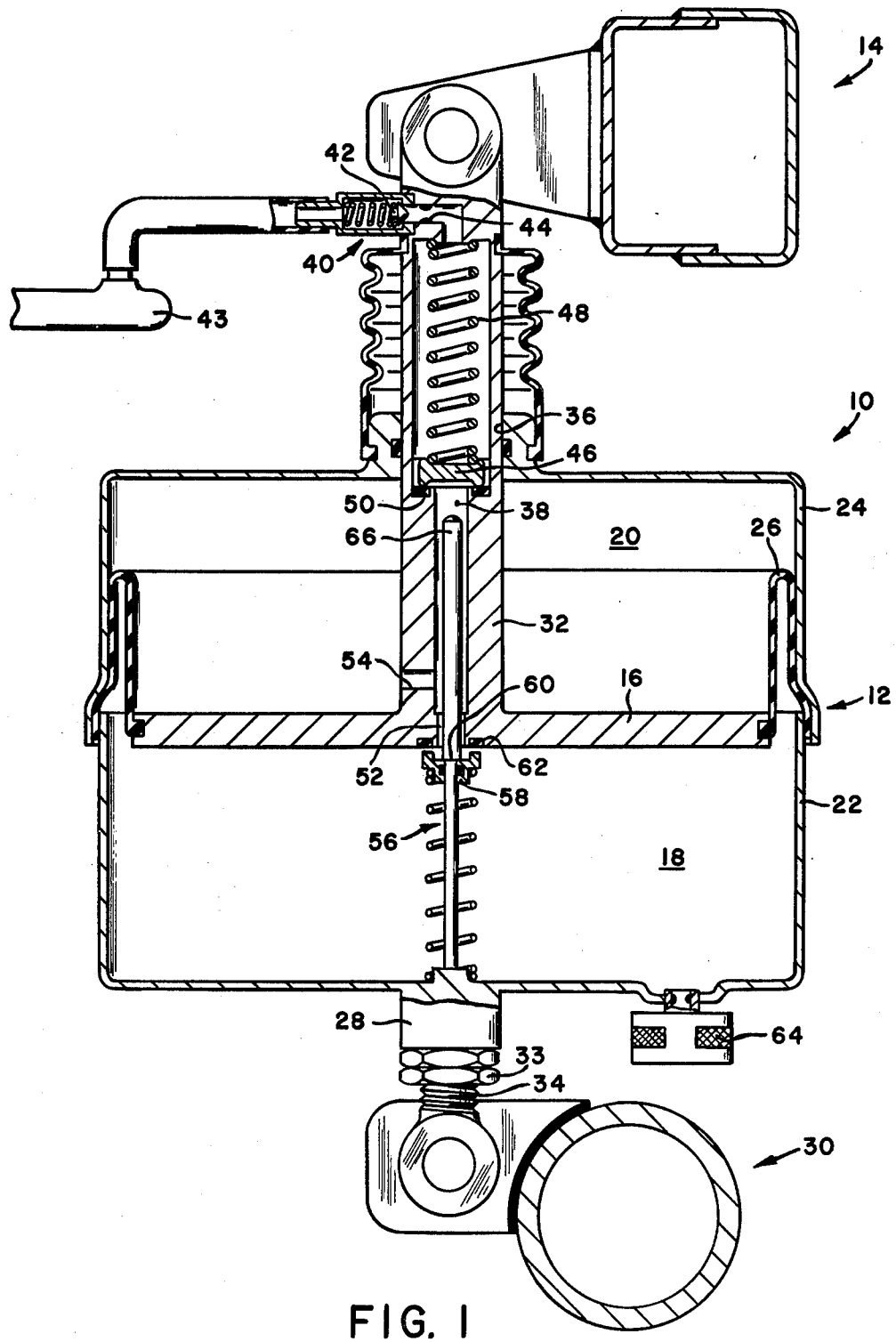
FIG. 1 is a schematic illustration of a leveling system showing the leveling device in cross section.

The leveling device of the present invention is illustrated at 10 in FIG. 1. A housing 12 is connected to a wheel mounting assembly 30 such as an axle tube and a piston 16 is movably disposed within the housing 12 to substantially define a pair of chambers 18, 20.

The housing 12 is formed by a lower pan 22 and an upper pan 24. The pans are fastened to each other by crimping or any other suitable means and cooperate to retain a resilient boot 26 which is sealingly fixed to the piston 16. The housing is formed with a projection 28 which is adapted for connection to a wheel mounting assembly 30. A bolt 34 is threadably received within the projection 28 and a nut 33 permits vertical adjustment of the housing 12 relative to the wheel mounting assembly 30.

The piston 16 includes a rod 32 which extends outwardly of the housing 12 to fasten to a body assembly 14. The rod 32 sealingly engages an opening 36 on the housing 12 and includes a passage 38. An inlet 40 communicates with the passage 38 and includes a check valve 42 and a restriction 44. The inlet 40 communicates with a pressure source 43 such as a vacuum manifold on the vehicle (not shown). A first valve member 46 is normally biased via spring 48 into seating engagement with a seat 50 on the piston to close communication through the passage 38. The passage 38 leads to an opeing 52 and an aperture 54 opens to the chamber 20 so that the opening 52 of the passage 38 normally provides for communication between the chambers 18 and 20.

A control member 56 is fastened to the housing 12 adjacent the projection 28. The control member 56 extends into the passage 38 and carries a second valve member 58. The second valve member 58 is biased against a shoulder 60 on the control member 56 and opposes a seat 62 on the piston 16. Normally, the second valve member 58 is spaced from the seat 62 to provide communication between the chamber 18 and the passage 38 via opening 52. A filter 64 vents the chamber 18 to atmosphere and the passage 38 is normally open via second valve member 58 to also vent the chamber 20 to atmosphere in the position of the piston illustrated.

MODE OF OPERATION

When the body assembly 14 is positioned a predetermined distance away from the wheel mounting assembly 30, the control member disposes the second valve member 58 in spaced relation to the seat 62 and the end 66 of the control member 56 is disposed in greater spaced relation to the first valve member 46. With the first valve member 46 being biased into engagement with the seat 50 by the spring 48, the vacuum source 43 is isolated from the chambers 18 and 20, so that the opened second valve member 58 provides for venting of chambers 18 and 20 to atmosphere via filter 64.

If a limited amount of weight is added to the body assembly 14, the body assembly 14 moves toward the wheel mounting assembly 30 so as to move the first valve member 46 toward the end 66 of the control member 56. As the weight added to the body assembly is small enough to avoid substantial movement of body assembly 14 toward the wheel mounting assembly 30, the valve member 46 approaches the end 66 of control member 56 but remains spaced therefrom.

If further weight over the normal carrying capacity of the vehicle is added to the body assembly 14, the latter overcomes the lifting force of a conventional spring assembly (not shown in FIG. 1) so as to move toward the wheel mounting assembly. When the body assembly moves toward the wheel mounting assembly, the piston moves in unison therewith relative to the housing 12. Consequently, the second valve member 58 is engageable with the seat 62 to close opening 52. Further movement of the body assembly and piston causes the end 66 to engage the first valve member 46 and separate the same from seat 50. As a result, the vacuum source 43 opens the check valve 42 to communicate with the passage 38 and the chamber 20 via aperture 54. With the chamber 20 in communication with the vacuum source 43 and the chamber 18 exposed to atmosphere, a pressure differential across the piston 16 is created so as to generate a lifting force causing the piston and attached body assembly to move vertically away from the wheel mounting assembly.

The lifting force on the piston 16 causes the latter to move upward until the valve member 46 engages the seat 50 at which time the valve member 58 remains in engagement with the seat 62 to maintain the pressure differential across the piston 16. The upward movement of the piston 16 also causes the body assembly 14 to move upward so that the preferred vertical setting or position of the latter is reestablished after a slight lowering of the same occurs when the extra weight is added to the body assembly.

ALTERNATE EMBODIMENTS

Figure 2:
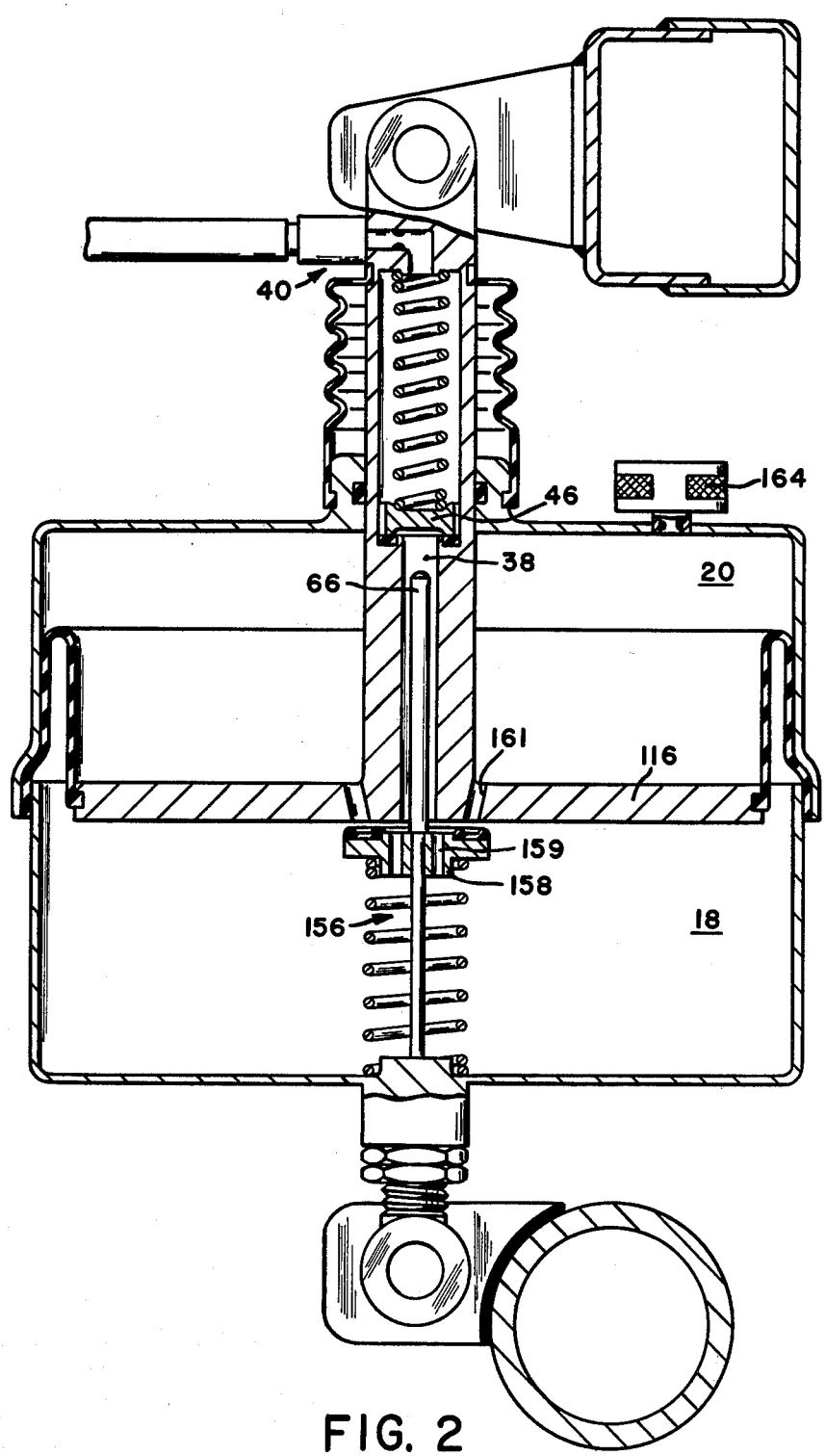
FIG. 2 is a view similar to FIG. 1 showing an alternate embodiment for the leveling device.

Turning to FIG. 2, it is seen that the second valve member 158 is provided with passages 159 and the piston 116 includes passages 161 so that the chambers 18 and 20 are normally in communication with each other. The inlet 40 is communicated with a pressure source (not shown) which generates positive pressure so that when the second valve member 158 is engageable with the piston 116 and the end 66 of control member 56 is engageable with the first valve member 46, the pressure source is communicated with the lower chamber 18 via passages 38 and 159. With the chamber 20 vented to atmosphere via filter 164, a pressure differential is created across the piston 116 to offset the movement of the body assembly toward the wheel mounting assembly as described above.

Figure 3:
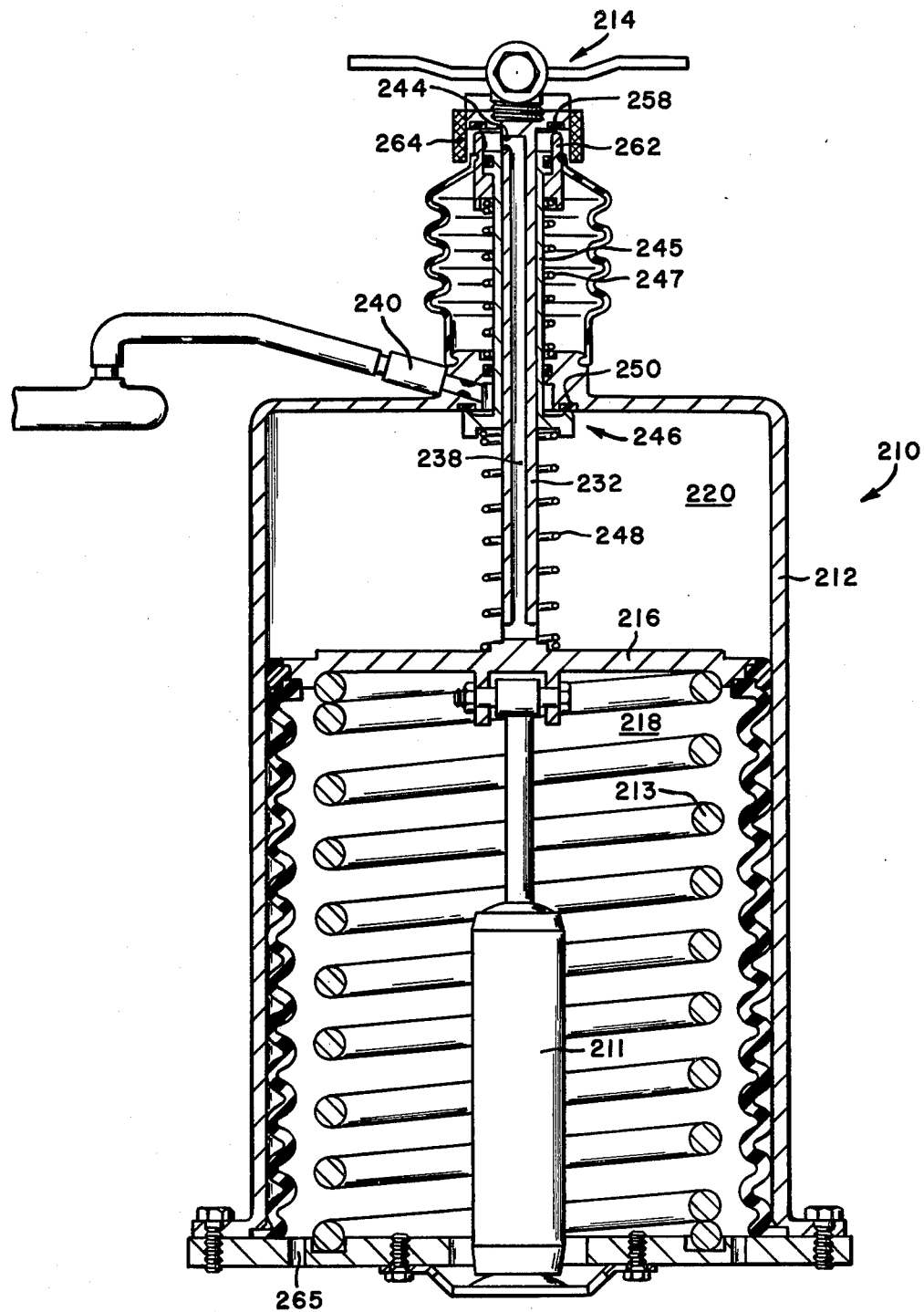
FIG. 3 is a cross section view showing the leveling device of the present invention integrally coupled to a shock absorber and coil spring assembly.

In FIG. 3 the leveling device 210 incorporates a shock absorber 211 and a coil spring 213 which are engageable with a piston 216 movably disposed within a housing 212. The piston 216 cooperates with the housing 212 to form a pair of chambers 218 and 220. A rod 232 extends outwardly of the housing from the piston 216 to engage a body assembly 214 and carries a valve member 258. Another valve member 246 is biased by springs 248 and 247 into engagement with a seat 250.

In the position illustrated a passage 238 communicates the chamber 220 to atmosphere via restriction 244 and filter 264 and the chamber 218 is exposed to atmosphere via openings 265. The valve member 246 normally closes the chamber 220 to a vacuum source (not shown) via inlet 240 while the valve member 258 normally opens the chamber 220 to atmosphere. When weight is added to the body assembly 214, the rod 232 and its attached valve member 258 are moved downward to engage the latter with a seat 262 which is fixed to a sleeve 245 defining the valve member 246, so as to close the passage 238 and chamber 220 to atmosphere. Also, the valve member 246 is moved downward away from seat 250 to open the chamber 220 to the vacuum source. Consequently, the vacuum pressure in chamber 220 and the atmospheric pressure in chamber 218 create a pressure differential across the piston 216. As a result a lifting force is applied to the piston 216 and rod 232 to return the body assembly 214 to its normal vertical position. The normal vertical position being substantially defined by the engagement of the valve member 246 with the seat 250.

I claim:

1. A leveling device for a vehicle having a vacuum source comprising:
    a housing disposed between a wheel supporting assembly for the vehicle and a body assembly for the vehicle, said housing being connected to one of said assemblies;
    a piston movably disposed within said housing and cooperating with said housing to define a pair of chambers, said piston including a rod extending outwardly of said housing to connect with the other of said assemblies;
    passage means normally communicating said pair of chambers with each other, and
    a control member cooperating with the piston and the passage means to close communication between the chambers and open communication between the vacuum source and one of the chambers when the body assembly moves a predetermined distance relative to the wheel supporting assembly, the other chamber being vented to atmosphere so as to create a pressure differential across the piston to oppose the movement of the body assembly relative to the wheel supporting assembly,
    said piston rod including a bore which forms a portion of said passage means, said control member extending into the bore and opposing a first valve member which normally closes communication between the vacuum source and the pair of chambers.

2. The leveling device of claim 1 in which a second valve member is carried by said control member, said second valve member cooperating with said piston to close communication between the pair of chambers when the body assembly moves a predetermined distance relative to the wheel supporting assembly.

3. The leveling device of claim 2 in which the second valve member is disposed within the other chamber.

4. The leveling device of claim 1 in which said piston rod includes an opening communicating the bore with the one chamber.

5. The leveling device of claim 1 in which said control member is stationary relative to one of the assemblies.

6. A leveling device for a vehicle having a vacuum source comprising:
    a housing carried by the vehicle;
    a piston movably disposed within said housing and cooperating therewith to substantially define a pair of chambers;
    passage means within said piston communicating the vacuum source with at least one of the pair of chambers;
    a first valve member normally closing communication between the vacuum source and one of the chambers;

a second valve member separate from said first valve member, said second valve member normally opening communication between the pair of chambers; and a control member extending into said passage means and being movable therein when said piston moves to cooperate with the first valve member and the second valve member to close communication between the pair of chambers and to open communication between the vacuum source and one of the chambers when the piston is moved a predetermined distance within said housing.

7. A leveling device for a vehicle, said vehicle having a pressure source, said pressure source including a source of pressurized fluid having a pressure level different than atmospheric pressure, said leveling device comprising:

a housing carried by the vehicle;

a piston assembly movably disposed within said housing and cooperating therewith to substantially define a pair of chambers;

passage means within said piston assembly for communicating said pressurized fluid with the pair of chambers, said piston assembly including a bore defining a portion of said passage means;

valve means cooperating with said piston assembly in a first position to close communication of said pressurized fluid between the pressure source and the pair of chambers, said piston assembly being movable to a second position wherein said valve means cooperates with said piston assembly to communicate said pressurized fluid with one of the chambers; and a control member extending into said bore and cooperating with said valve means to define the first and second positions for said piston assembly.

8. The leveling device of claim 7 in which said valve means comprises a first valve member carried by said piston assembly and a second valve member carried by said control member.

9. A leveling device for a vehicle, said vehicle having a pressure source, said pressure source including a source of pressurized fluid having a pressure level different than atmospheric pressure, said leveling device comprising:

a housing carried by the vehicle;

a piston assembly movably disposed within said housing, said piston assembly moving within said housing in response to changes in the level of the vehicle, said piston cooperating with said housing to substantially define a pair of chambers;

passage means within said piston assembly for communicating the pair of chambers with each other, said passage means further communicating said pressurized fluid with said pair of chambers;

valve means cooperating with said piston to close communication of said pressurized fluid with the pair of chambers when said piston assembly is in a first position; and a control member extending into said passage means and cooperating with said valve means to open communication of said pressurized fluid with one of the chambers and close communication between the pair of chambers, said control member automatically cooperating with said valve means as said piston assembly moves to a second position.

* * * * *